United States Patent [19]

Roos et al.

[11] Patent Number: 4,752,099
[45] Date of Patent: Jun. 21, 1988

[54] CABLE GUIDE FOR AUTOMOBILE SLIDING ROOFS

[75] Inventors: Rudolf Roos, Maintal; Dieter Federmann, Hanau, both of Fed. Rep. of Germany

[73] Assignee: Rockwell-Golde GmbH, Fed. Rep. of Germany

[21] Appl. No.: 905,001

[22] Filed: Sep. 8, 1986

[30] Foreign Application Priority Data

Oct. 25, 1985 [DE] Fed. Rep. of Germany ....... 3537964

[51] Int. Cl.$^4$ ........................... B60J 7/057; B60J 7/05
[52] U.S. Cl. ................................................. 296/223
[58] Field of Search ............... 296/216, 221, 222, 223; 104/280; 49/412; 16/95 R; 384/15

[56] References Cited

U.S. PATENT DOCUMENTS

| | | | |
|---|---|---|---|
| 3,290,087 | 12/1966 | Werner | 296/222 |
| 4,163,591 | 8/1979 | Henning | 384/15 |
| 4,272,123 | 6/1981 | Mori | 296/223 |
| 4,616,885 | 10/1986 | Komiya | 384/49 |

FOREIGN PATENT DOCUMENTS 1946161 3/1971 Fed. Rep. of Germany .
2121872 1/1984 United Kingdom ................ 296/222

*Primary Examiner*—Dennis H. Pedder

[57] ABSTRACT

A cable guide for automobile sliding roofs comprising an upwardly open profile cavity, which communicates with cable guide channels and guide channels for guide shoes of forward and rear guide elements guiding a sliding lid, a flexible cover element is provided, which engages slidably into the cavity and closes the top of this cavity. The flexible cover element participates in the sliding movements of the sliding lid and ensures that, in every slid-open position of the lid, no portion of the cavity is upwardly open, so that dirt and other foreign matter cannot penetrate into the cavity and thereby into the cable guide channels and the guide channels for the guide shoes.

3 Claims, 5 Drawing Sheets

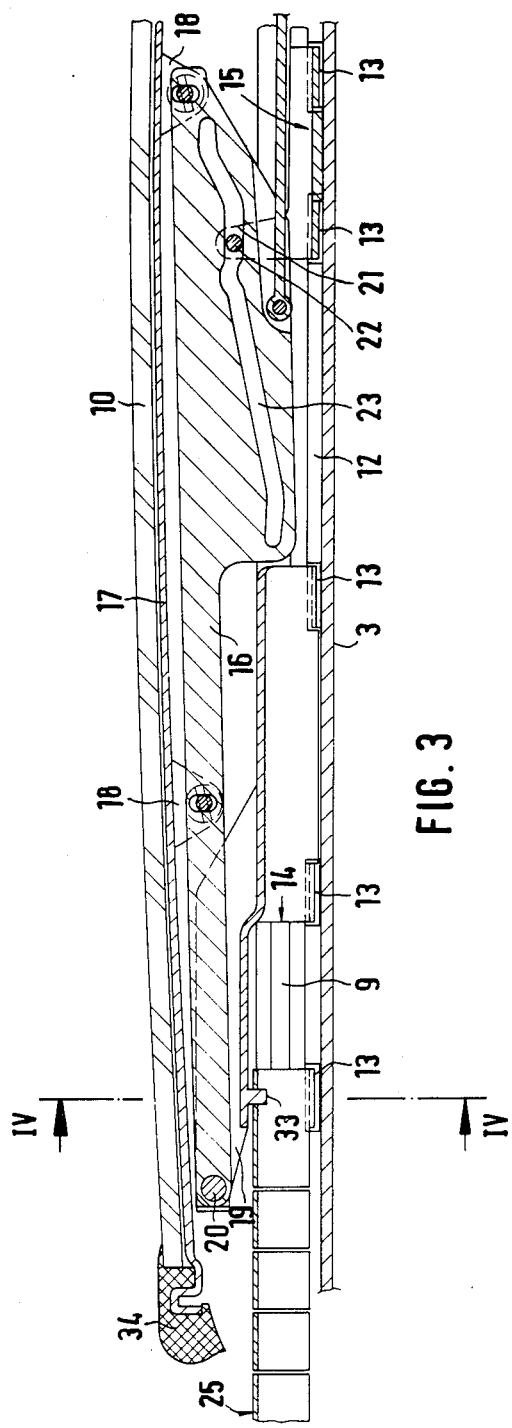
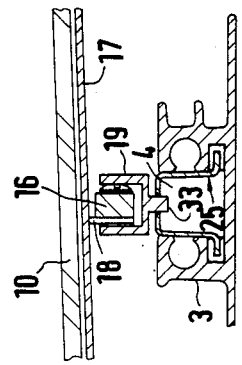
FIG. 3
FIG. 4

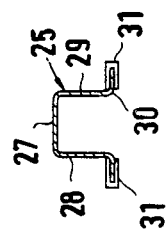
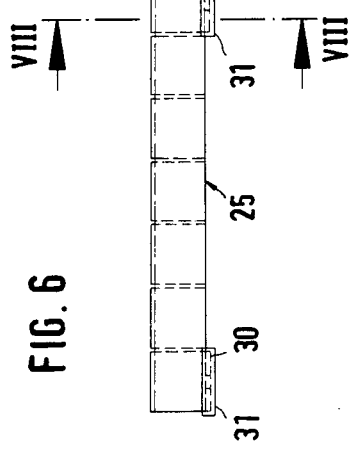
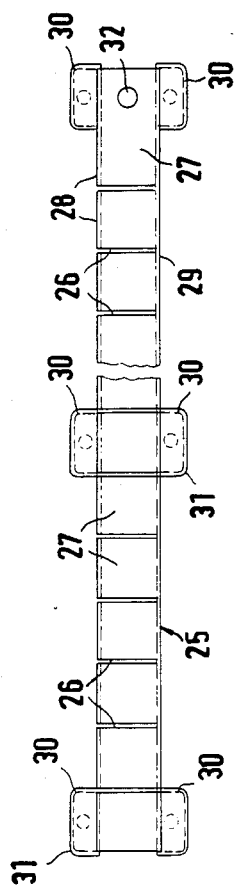

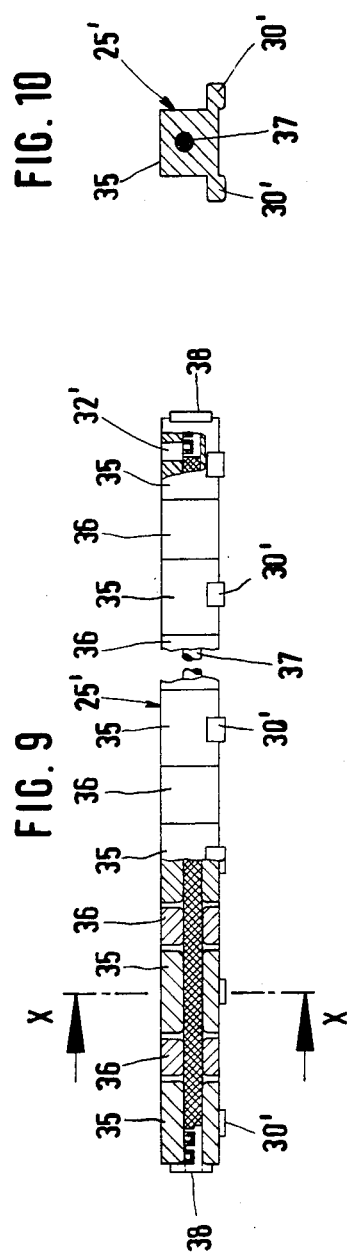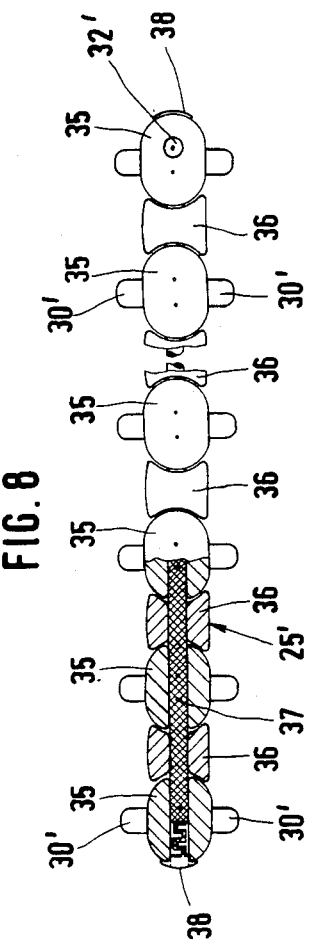

CABLE GUIDE FOR AUTOMOBILE SLIDING ROOFS

FIELD OF THE INVENTION

This invention relates to a cable guide for automobile sliding roofs.

BACKGROUND OF THE INVENTION

The term "sliding roof" is intended for the purposes of this description to include not only those constructions in which the sliding lid, after its rear fixed roof surface to expose the roof opening, but also so-called sliding-lifting roof constructions, wherein the sliding lid, in addition, starting from its closed position can be pivoted about a pivot axis fitted in the vicinity of its front edge to raise it above the fixed roof surface.

DESCRIPTION OF THE PRIOR ART

A cable guide is known from DE-PS 32 21 487, in which two lateral guide components and a front guide component have an identical profiling and are shaped from a single length of profile strip to give a one-piece guide frame, open at the back. The present invention can be used with a one-piece guide frame of this type of continuous profile strip. It can be used, however, also on cable guides composed of a plurality of parts, provided that, at least in the region of an upwardly open profile cavity and the guide channels, the various guide components have the same profiling.

If, in cable guides of this type, the sliding lid is displaced entirely or partly beneath the rear, fixed roof surface, then the profile cavities in the two lateral guide components are to a greater or lesser extent exposed. These profile cavities are here unprotected against the entry of foreign matter, such as dust, sand, leaves or the like. Foreign matter entering the profile cavities can also get into the cable guide channels and guide channels which are open towards the profile cavities, which can lead to functional defects of the sliding roof, particularly to difficult running of the sliding roof drive. Such operational defects can, of course, frequently occur in those regions, for example desert regions, in which the vehicle is driven with the sliding roof usually or permanently opened.

OBJECT OF THE INVENTION

It is accordingly an object of the present invention to provide a cable guide, in which, when the sliding lid is pushed open, foreign matter cannot enter the profile cavities of the cable guide nor therefore penetrate the cable guide channels and the guide channels for guide shoes of the sliding lid.

SUMMARY OF THE INVENTION

According to one aspect of the present invention, there is provided a cable guide for an automobile sliding roof, the guide including two lateral, mutually parallel guide components, which slidably guide guide shoes of front and rear guide elements of a sliding lid, a front guide component, adjoining the two lateral guide components via rounded corners, the guide components each having substantially an upwardly open, U-shaped cross-section constituting a profile cavity, with thickened side walls in which are disposed, in opposite-handed arrangement and one above another, upper cable guide channels opening into said cavity and lower guide channels for said guide shoes, said cavity being closed by a cover in the region of the front guide component, and the cavity in each said lateral guide component also being substantially covered over by flexible cover elements in the region between the front guide elements and a front edge of the sliding lid and extending forwards, said flexible cover elements slidably engaging into said guide channels so as to be slidable in each said cavity, being connected by their rearward ends with components participating in the sliding movements of the lid and extending with their forward ends, even when the sliding lid is slid fully open, beneath said cover.

According to another aspect of the present invention, there is provided a cable guide for an automobile sliding roof, the guide including front and lateral guide components each having an upwardly-open, elongate cavity receiving guide elements of a sliding lid, a cover closing said cavity in the region of said front guide component, flexible cover elements covering said cavity between said cover and said guide elements, said flexible cover elements being attached to and extending forwardly of said guide elements for sliding movement therewith in said cavity, and part of each of said cover elements extending at all times beneath said cover thereby to inhibit ingress of foreign matter into said cavity.

With advantage, the arrangement is such that the flexible cover elements are connected by their rear ends to the forward guide elements of the sliding lid. In this way, assurance is provided that the profile cavities in the region between the forward guide elements and the front edge of the sliding lid are also covered, so that foreign matter penetrating from the front beneath the forward edge of the sliding lid cannot get into the profile cavities. The connection of the flexible cover elements directly to the forward guide elements ensures trouble-free participation of the flexible cover elements in sliding movements.

For guiding the flexible cover elements inside the profile cavities of the guide components, the arrangement is preferably such that the flexible cover elements are equipped with laterally projecting guide fingers, fitted at intervals, for engagement into the guide channels. A few guide fingers, distributed over the length of the flexible cover elements, are sufficient for keeping the flexible cover elements securely in the profile cavities. The lateral guidance of the flexible cover elements is provided by the lateral surfaces of the cover elements in co-operation with the lateral surfaces, facing towards them with slender gaps between, of the thickened side walls of the guide components. This lateral guidance of the flexible cover elements also ensures that the cover elements bend when entering or leaving the rounded corners of the front guide component.

For achieving a smooth-surfaced cable guide, it is advantageous for the upper surfaces of the flexible cover elements to be disposed substantially flush with the adjacent upper surfaces of the guide components.

In a first form of embodiment for the flexible cover elements, provision is made for these elements to be formed from a thin-walled, U-section, downwardly open bar or strip, of which the upper wall together with one of the side walls are incised or cut into at intervals, in such a way that the upper wall and the relevant side wall are always provided throughout with a slit, whereas the other side wall is left intact at the position of the slit. The slits therefore are formed throughout in the same direction from one side, which is the outer side in the region of the rounded corner of the cable guide. The side wall regions unaffected by the slits ensure elastic flexibility of the cover elements.

In a second form, provision is made for the flexible cover elements each to be composed of a plurality of chain links, of two different shapes and disposed alternately in series on a cable or the like. One type of link is substantially semi-cylindrically convex at both ends and the other type, engaging form-fittingly therewith, is generally semi-cylindrically concave at both ends. With these chain-like cover elements also, assurance is provided that smooth, virtually gap-free external surfaces result, which prevent the penetration of foreign matter.

In a third form, the flexible cover elements are each constituted of chain links having the same form and dimensions, which are semi-cylindrically convex at both ends and possess, at both ends, substantially semi-cylindrical recesses, concentric to the semi-cylindrical ends, extending as far as the horizontal central plane of the chain links, and their radius being somewhat larger than that of the semi-cylindrical, convex ends. A pivot pin, concentric with the cylindrical curvature, is provided in the recess at one end and a corresponding bearing bore at the other end. The chain links provided in this embodiment possess the advantage of identical construction, if one disregards the guide fingers which do not need to be provided on every chain link. The described recesses can start at both ends of each chain link from one and the same side of the link or from opposite sides. In either case, an articulated connection of the chain links without gaps and thus a closure of the profile cavities to the outside is achieved.

BRIEF DESCRIPTION OF THE DRAWINGS

For a better understanding of the invention and to show how the same may be carried into effect, reference will now be made, by way of example, to the accompanying drawings, in which:

FIG. 3 is a part longitudinal section through the cable guide taken along the line III—III in FIG. 1, but with the sliding lid and some of the functional components connected with it shown cut-away, FIG. 4 is a part section taken along the line IV—IV in FIG. 3, FIG. 5 is a plan view of a first form of flexible cover element, FIG. 6 is a lateral view of the flexible cover element of FIG. 5, FIG. 7 is a section through the cover element taken on the line VII—VII in FIG. 6, FIG. 8 is a partly sectioned plan view of a second form of flexible cover element, FIG. 9 is a partly sectioned lateral view of the flexible cover element of FIG. 8, FIG. 10 is a section through the second form of cover element taken along the line X—X in FIG. 9.

DETAILED DESCRIPTION OF THE PREFERRED EMBODIMENTS

Figure 1:
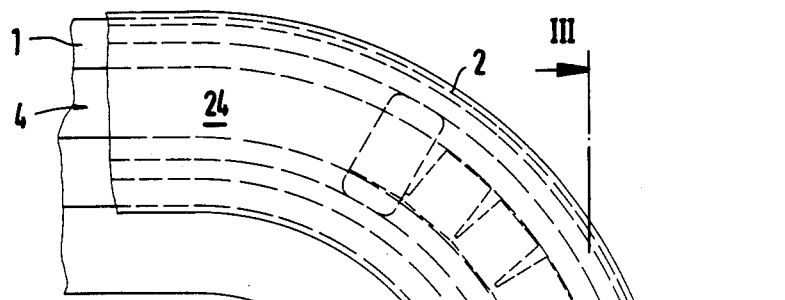
FIG. 1 is a part plan view of a cable guide for an automobile sliding roof.

In FIG. 1, a single-piece, frame-like cable guide is shown, which consists of a front guide component 1, a rounded corner 2 and a lateral guide component 3. Due to the symmetrical arrangement of the cable guide, only a part of the right-hand side of the cable guide, as viewed in the direction of travel, is shown. The guide components 1 and 3 have an identical profiling throughout, which may be seen, for example, from FIG. 2.

The guide components 1 to 3 possess a substantially U-shaped cross-section having an upwardly open profile cavity 4, which is bounded below by a web wall 5 and at the sides by two thickened side walls 6 and 7. In the thickened side walls 6, 7, there are situated, in symmetrical arrangement about the centre-line, one above another and open towards the cavity 4, upper cable guid channels 8, 9 for receiving flexible drive cables 40 (FIG. 2) for moving a sliding lid 10 shown in FIG. 3, and lower guide channels 11 and 12 for guide shoes 13 of forward and rearward guide elements 14, 15 of the sliding lid 10 (FIGS. 1 and 3).

As can be seen particularly from FIG. 3, the two guide elements 14, 15 are connected to an elongate guide block 16, to which the sliding lid 10, which in the present example consists of a transparent plastics or glass material but could also be made of sheet metal, is attached by bearing blocks 18 fixed to a lid reinforcing frame 17. The lid 10 is adjustable in height relative to the guide components. The forward guide element 14 possesses an upwardly and forwardly orientated bearing element 19, on which the guide block 16 and therefore the sliding lid 10 is pivotally journalled by a horizontal bearing pin 20.

The rear guide element 15 possesses an also upwardly orientated actuating element 21, on which a guide finger 22 is horizontally mounted, this guide finger engaging into a guide slot 23 of the guide block 16 and controlling the displacement and raising functions of the sliding lid 10 via a flexible actuating cable (not shown) which acts upon the rear guide element 15. The guide elements 14, 15 and the components connected therewith are situated substantially in the cavity 4 of the lateral guide component 3 or engaged therein as the case may be.

The cavity 4 in the front guide component 1 and in the rounded corner 2 is closed above by a fixed cover 24 (FIGS. 1 and 2), so that in the region of the front guide component 1, including the adjacent rounded corner 2, no foreign matter can penetrate into the profile cavity 4. When the sliding lid 10 is closed, the forward guide element 14 is situated in the forward region of the lateral guide component 3 and bears against the end of the cover 24.

To explain the flexible cover elements provided for the cavity 4, reference will now be made to three different embodiments thereof.

Figure 2:
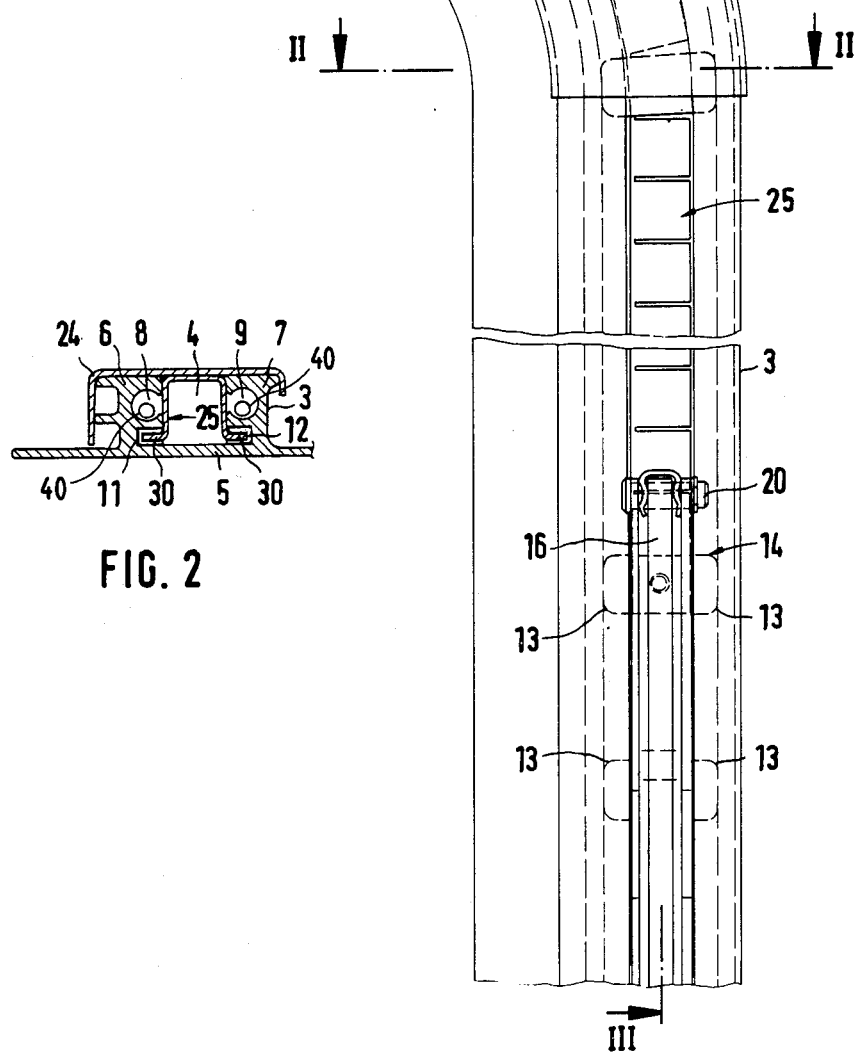
FIG. 2 is a cross-section through the cable guide taken along the line II—II in FIG. 1.
Figure 13:
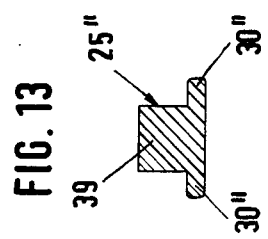
FIG. 13 is a cross-section through the third form of cover element taken on the line XIII—XIII in FIG. 12.

The first embodiment can be seen in FIGS. 1 and 2 in conjunction with FIGS. 5 to 7. The flexible cover element shown there, generally referenced 25, is formed of a thin-walled, U-section, downwardly open bar or strip, made for example from stainless steel sheet. The strip is furnished at regular intervals with slits 26, which each extend completely through the upper wall 27 and the side wall 28, but leave the other side wall 29 intact. The U-shaped profiling of the flexible cover element 25 is so dimensioned that the distance between the outer surfaces of the side walls 28, 29 is slightly less than the distance between the mutually facing surfaces of the side walls 6, 7 of the guide components 1 to 3. The height of the profiling is, by contrast, so adapted to the depth of the cavity 4 that the upper surface of the flexible cover element 25 lies flush with the upper surfaces of the thickened side walls 6, 7, as can be seen in FIGS. 2 and 4. These Figures also illustrate that the flexible cover element 25 virtually fills the cavity 4, so that foreign matter cannot penetrate from outside into the cable guide channels 8, 9 and the guide channels 11, 12.

The forming of the slits 26 imparts to the cover element 25 an articulated structure and, of course, also its flexibility in bending. On at least three of the links formed by the slits 26, there are integrally formed, outwardly projecting guide fingers 30 in pairs, which are furnished with a low-friction coating 31, these guide fingers 30 slidably engaging in the guide channels 11, 12. At the rearward end, the flexible cover element 25 is furnished, in its upper wall 27, with an entraining bore 32 (FIG. 5), into which there engages from above an entraining pin 33 (FIGS. 3 and 4) fitted to the front guide element 14.

Due to the permanent engaging of the entraining bore 32 by the entraining pin 33, the flexible cover element 25 follows all the sliding movements of the guide element 14. The cover element is guided laterally by its lateral walls 28, 29 along the mutually facing surfaces of the side walls 6, 7 of the guide components 1 to 3 and is prevented by the guide fingers 30, engaging into the guide channels 11, 12, from escaping upwards out of the cavity 4. Due to the slits 26, the flexible cover element 25 is elastically bent in the region of the rounded corner 2 in its side wall 29. When the sliding lid 10 is fully closed, the flexible cover element 25 is situated substantially underneath the cover 24 in the cavity 4 of the front guide component 1 and the rounded corner 2. When the sliding lid is slid fully open, the flexible cover element 25 is still situated, with its forward end, beneath the cover 24, so that the entire otherwise exposed length of the cavity 4 in the lateral guide component 3 is closed by the flexible cover element 25. Where the flexible cover element 25 bends in the region of the rounded corner 2, the slits 26 widen out to a wedge shape, as FIG. 1 shows. As FIG. 3 shows, the rearward end of the flexible cover element 25 is situated, on account of its connection with the forward guide element 14, behind the front edge of the sliding lid 10 formed by an edge gap seal 34, so that dirt also cannot penetrate from the front beneath the front edge of the sliding lid 10 into the cavity 4.

In the second form of the flexible cover element 25', which can be seen in FIGS. 8 to 10, a plurality of chain links 35 and 36, of two different shapes, is alternately provided, each of which is equipped with a central bore, not referenced, by which they are threaded onto a flexible, elastic cable 37 or the like, and are held, in mutual contact and so that they cannot be lost from the cable 37, by the fitting of end blocks 38.

The chain links 35, 36, of which only one chain link 35 is shown in FIG. 10 in cross-section, have a substantially similar cross-section, which virtually fills the cross-section of the cavity 4 in the guide components 1 to 3. The curve negotiating ability required for movement of the flexible cover element 25' in the region of the rounded corner 2 is made possible by appropriate forms of the ends of the chain links 35, 36. The chain links 35 have the same semi-cylindrical convex form at both ends, whereas the chain links 36 are correspondingly semi-cylindrically concave at both ends. The curvatures of both types of chain link are therefore adapted to one another for a form-fitting engagement. At the rear end, that is in the last chain link 35, there is once again an entraining bore 32' for engagement with the entraining pin 33 of the forward guide element 14. In the example shown, all the chain links 35 are furnished with guide fingers 30', projecting laterally in pairs, for engagement into the guide channels 11, 12 of the guide components 1 to 3. It is, however, possible to equip only some of the chain links 35 or all of the chain links 36 or only some of the chain links 36 with guide fingers 30'. The chain links 35, 36 may be injection moulded from a suitable plastics.

Figure 14:
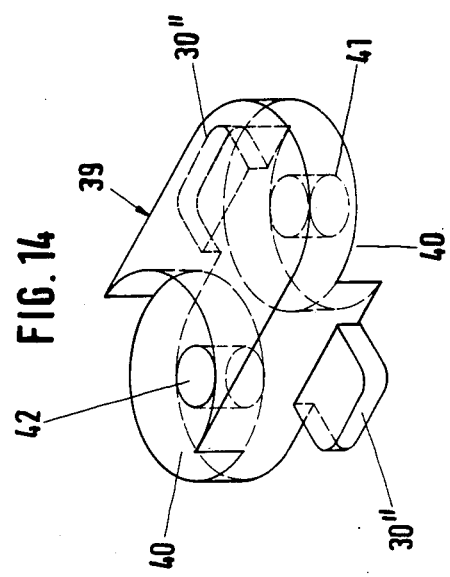
FIG. 14 is a perspective view of a single chain link of the cover element illustrated in FIGS. 11 to 13.

To explain the third form of the flexible cover element 25", reference is now made to FIGS. 11 to 14. In this case, the flexible cover element 25" consists of chain links 39, all of the same form and dimensions, of which one is shown in FIG. 14. The chain links 39 once again have a cross-section (FIG. 13) which almost fills the cross-section of the cavity 4 in the guide components 1 to 3. The chain links 39 are each so shaped that they are of semi-cylindrical convex form at both ends as viewed in plan, approximately semi-cylindrical recesses 40 being provided concentrically with each of the two semi-cylindrical end rounded zones, one recess being in the upper face and one in the lower face of the chain link 39. The recesses 40 extend from the upper or lower face respectively of the chain link as far as the imaginary horizontal central plane of the link 39. The radius of curvature of the recesses 40 is somewhat larger than the radius of curvature of the semi-cylindrical, convex ends of the chain link 39, so that the engagement, to be explained below, with the adjacent chain links is possible with a small movement clearance.

At one end of the chain link, there is situated concentrically to the cylindrical curvature in the recess a pivot pin 41, whereas at the other end of the chain link 39 a corresponding bearing bore 42 for receiving the pivot pin 41 of the neighbouring link is disposed, also concentrically to the cylindrical curvature present there. Some or all of the chain links 39 once again may be equipped with laterally projecting guide fingers 30" for engagement into the guide channels 11, 12 of the guide components 1 to 3.

Figure 12:
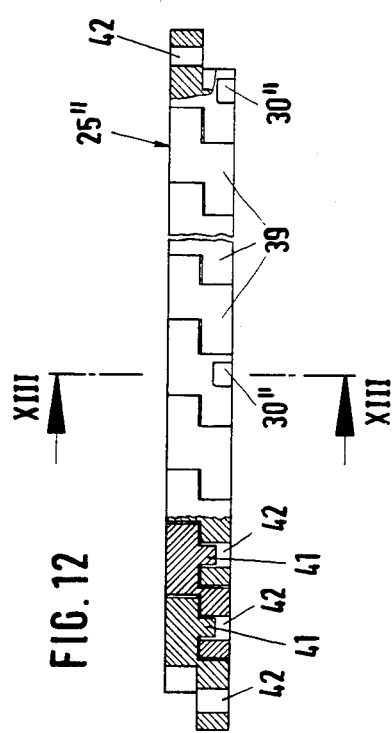
FIG. 12 is a partly sectioned lateral view of the cover element shown in FIG. 11.
Figure 11:
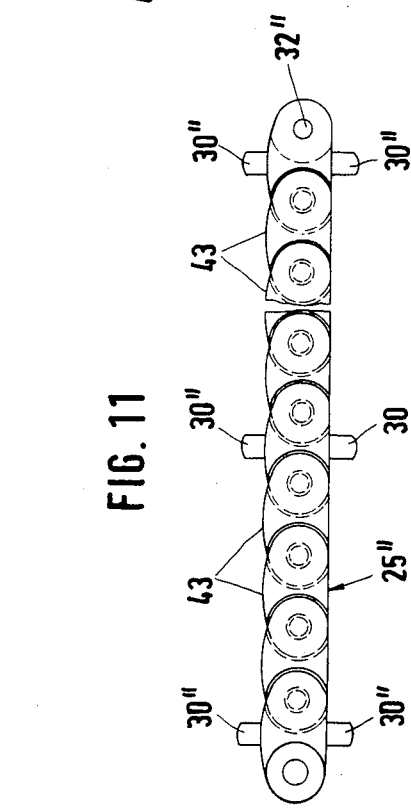
FIG. 11 is a plan view of a third form of flexible cover element.

As FIGS. 11 and 12 illustrate, the thus formed chain links 39 can be connected together fitting closely one into another, one semi-cylindrical convex end of one chain link engaging into the recess 40 of the adjacent chain link at the connection between each pair of links. Also, the pivot pin 41 of one link engages into the bearing bore 42 of the neighbouring link. As a result of the form of the individual chain links 39, the flexible cover element 25" can readily adapt to the curvature of the cavity 4 through the rounded corner 2. At the rearward end of the flexible cover element 25", that is in the last chain link 39, there is once again an entraining bore 32" for engagement with the entraining pin 33 of the forward guide element 14. To improve the adaptation of the flexible cover element 25" to tight curve radii in the region of the cavity 4 at the rounded corner 2, the chain links may be provided with a convex outer surface 43, as shown in FIG. 11. The chain links of this form of embodiment also may be injection moulded from plastics.

It is not necessary for the recesses 40 to be formed on opposite sides of the chain link 39. The two recesses 40 can also be formed from one side into the chain link 39. In this case, adjacent chain links 39, when the flexible cover element 25" is assembled, simply need to be turned through 180° about their longitudinal axis, to enable them to be connected together.

It will be appreciated that the flexible cover elements virtually fill the cavity 4, so that no foreign matter can penetrate into the cavity 4 from above when the sliding lid 10 is slid open. The flexible cover elements are slid together with the sliding lid 10, entering the cavity 4 of the front guide component 1 when the lid 10 is slid closed. Due to their flexibility, the rounded corners 2 of the front guide component 1 do not lead to any difficulties here. The length of the flexible cover elements is such that, even when the sliding lid 10 is slid fully open, they still penetrate with their front ends beneath the fixed cover 24 of the front guide component 1. Foreign matter therefore cannot enter, regardless of the particular slid position of the sliding lid. The cable guide channels and the guide channels for the guide shoes of the sliding lid, which are especially sensitive to dirt and impurities, are therefore always protected.

We claim:

1. A cable guide for an automobile sliding roof in which a sliding lid is slidable beneath a fixed roof surface to expose a roof opening comprising:
   front guide elements and rear guide elements located below said sliding lid;
   guide shoes attached to said guide elements;
   two lateral guide components for slidably guiding said guide shoes;
   a front guide component adjoining the two lateral guide components;
   said two lateral guide components each having an upwardly open U-shaped cross-section constituting a profile cavity;
   said lateral guide components each housing an upper guide channel and a lower guide channel on each side of said U-shaped profile cavity, said upper pair of guide channels receiving the cable and said lower guide channels receiving the guide shoes for the front and rear guide elements of said sliding lid;
   a flexible cover element for each of said profile cavities, each element being formed of a thin walled U-section downwardly open strip;
   said downwardly open strip having an upper wall and two side walls;
   each upper wall and one side wall being cut at equally spaced intervals forming slits along the length of the strip whereby the other side wall is not slitted but left intact.

2. A cable guide for an automobile sliding roof in which a sliding lid is slidable beneath a fixed roof surface to expose a roof opening comprising:
   front guide elements and rear guide elements located below said sliding lid;
   guide shoes attached to said guide elements;
   two lateral guide components for slidably guiding said guide shoes;
   a front guide component adjoining the two lateral guide components;
   said two lateral guide components each having an upwardly open U-shaped cross-section constituting a profile cavity;
   said lateral guide components each housing an upper guide channel and a lower guide channel on each side of said U-shaped profile cavity, said upper paid of guide channels receiving the cable and said lower guide channels receiving the guide shoes for the front and rear guide elements of said sliding lid;
   a flexible cover element for each of said profile cavities formed of a plurality of chain links of different shape; alternately arranged in a row, one shape being semi-cylindrically convex at both ends, the other semi-cylindrically concave at both ends.

3. A cable guide for an automobile sliding roof in which a sliding lid is slidable beneath a fixed roof surface to expose a roof opening comprising:
   front guide elements and rear guide elements located below said sliding lid;
   guide shoes attached to said guide elements;
   two lateral guide components for slidably guiding said guide shoes;
   a front guide component adjoining the two lateral guide components;
   said two lateral guide components each having an upwardly open U-shaped cross-section constituting a profile cavity;
   said lateral guide components each housing an upper guide channel and a lower guide channel on each side of said U-shaped profile cavity, said upper pair of guide channels receiving the cable and said lower guide channels receiving the guide shoes for the front and rear guide elements of said sliding lid;
   a flexible cover element for each of said profile cavaties consisting of chain links having the same form and dimensions and being semi-cylindrically convex at both ends and with recesses at both ends; and
   said chain links being connected to each other by pivot pins extending within said recesses.

* * * * *